Patented Mar. 29, 1932

1,851,019

UNITED STATES PATENT OFFICE

WILFRED M. MURCH, OF HAMBURG, NEW YORK, ASSIGNOR TO NATIONAL ANILINE & CHEMICAL COMPANY, INC., OF NEW YORK, N. Y., A CORPORATION OF NEW YORK

PRODUCTION OF HALOGEN DERIVATIVES OF BENZANTHRONE

No Drawing.   Application filed November 22, 1926.  Serial No. 150,161.

This invention relates to a process of making halogen derivatives of benzanthrone, and the isoviolanthrone obtainable therefrom by fusion with alcoholic potash or other condensing agent.

In the halogenation of benzanthrone by subjecting it in aqueous suspension to the action of chlorine or of bromine, there is produced a halogenated benzanthrone which is very impure, it being contaminated with large amounts of oxidation products, etc. Similarly, a halogenated benzanthrone obtained by treating a concentrated sulfuric acid solution of benzanthrone with chlorine is also impure and usually contains benzanthrone together with various halogen derivatives and other products. The velocity of the reaction is slow in either of these processes, and the crude halogenated benzanthrone obtained by either method when converted into an isoviolanthrone by fusion with alcoholic potash or in any other known matter gives a dyestuff of weak tinctorial power the dyeings of which are relatively dull and blue in shade.

Benzanthrone and chlor-benzanthrone are each readily soluble in concentrated sulfuric acid (66° Bé.) but are practically insoluble in sulfuric acid of less than about 60 per cent. strength. Chlorbenzanthrone, however, is relatively less soluble than benzanthrone, particularly in a sulfuric acid of moderate strength, for instance, of about 60 to 70 per cent. strength. For example, a sulfuric acid of about 63 to 65 per cent. strength at about 25° C. will dissolve about 10 per cent. or more of its weight of benzanthrone but dissolves very little, about one per cent., or less, of chlorbenzanthrone. However, sulfuric acid containing one of these substances in solution dissolves somewhat more of the other substances than when that substance is present alone.

If a solution of benzanthrone in sulfuric acid of about 70 per cent. strength or stronger is diluted with water the solution separates into two liquid phases of different composition when a certain definite acid concentration is reached. In general, depending to some extent on the presence or absence of impurities or other substances in the solution, the separation into two liquid phases occurs when the acid to water ratio is such that the strength of the acid is around 66 to 67 per cent. These two liquid phases are capable of existence only within a comparatively narrow range of acid concentration for upon further dilution with water a concentration of acid is soon reached, generally about 61 to 62 per cent., at which benzanthrone is precipitated as a solid phase. Similar results may be obtained, but in the reverse order, by adding concentrated sulfuric acid to a suspension of benzanthrone in water. These two liquid phases do not differ largely in their percentage acid content but in their benzanthrone content they differ considerably. For example, the composition of one of the liquid phases may contain only about 0.2 to 2 per cent. of benzanthrone while the other phase may contain from 18 to 26 per cent. or more.

An impure benzanthrone behaves similarly although the acid strength at which the two phases occur may be somewhat different because of the impurities present.

The present invention contemplates the halogenation of benzanthrone by subjecting it to the action of a halogenating agent in the presence of sulfuric acid of such strength that the benzanthrone is comparatively soluble therein while the halogen derivative of benzanthrone produced is relatively insoluble or only slightly soluble therein. Depending to some extent on the purity of the benzanthrone and other factors, the strength of sulfuric acid required will lie within the range of about 60 to 70 per cent. sulfuric acid. In this strength of acid, the halogen is rapidly absorbed with the production of a halogen derivative of benzanthrone which separates out of solution during the process. The product thus obtained differs from the crude halogenated benzanthrones hitherto produced in giving an isoviolanthrone by fusion with alcoholic potash of high tinctorial value and whose dyeings are redder and brighter. A halogenated derivative having similar properties may be obtained from an impure benzanthrone by the process of the present invention.

In carrying out the present invention the benzanthrone is dissolved preferably in about 4 to 10 times its weight of sulfuric acid of about 70 per cent. strength or stronger, and the solution is then diluted with water until two liquid phases containing benzanthrone are formed but no benzanthrone precipitated as a solid phase, and the mixture subjected to the action of a halogenating agent. The process may be carried out at any suitable temperature but room temperatures, or temperatures of about 0° to 40° C., are preferably employed. It will be understood, however, that the process can be carried out at higher temperatures and in the presence of any amount and strength of sulfuric acid which is capable of dissolving considerable amounts of benzanthrone but inconsiderable amounts of the halogen derivatives thereof. Ordinarily, the strength of acid employed lies between about 60 and 70 per cent.

The invention will be further illustrated by the following example, but it will be understood that the invention is not limited thereto. The parts are by weight.

Example: 100 parts benzanthrone of 90 per cent. purity are dissolved at ordinary temperature in 550 parts of sulfuric acid of 70 per cent. strength. To the well agitated solution, there is added ice or ice water until a second liquid phase containing benzanthrone is formed but no solid benzanthrone separates. The average strength of the diluted sulfuric acid at this point is preferably about 66 to 67 per cent. To the well stirred mixture at a temperature of about 20° to 30° C., a current of chlorine is introduced until about 32 parts are absorbed. This is about 6 to 8 per cent. in excess of that required by theory to form monochlorbenzanthrone. During the chlorination, monochlorbenzanthrone separates out of solution. About 3 to 4 hours are usually required to complete the chlorination. When the reaction is completed, the monochlorbenzanthrone is substantially completely precipitated by pouring the mixture into sufficient water to give about a 5 per cent. sulfuric acid solution. About 4,000 parts of water are required. The precipitate is filtered off, washed with a 5 per cent. caustic alkali solution and then with water until substantially neutral. It is then dried at any suitable temperature.

The product thus obtained contains about 12 to 14 per cent. chlorine and contains very little, if any, oxidation products or unchlorinated benzanthrone. When dry, it possesses a greenish yellow color. Upon purification by recrystallization from monochlorbenzene it is obtained as a crystalline product of a yellow color. The crude product when fused with alcoholic potash gives an isoviolanthrone of high tinctorial value as a dyestuff, and from a hydrosulfite bath it dyes cotton redder and brighter shades than an isoviolanthrone produced from a crude chlorbenzanthrone made by the heretofore known processes mentioned above. Moreover, the yields of monochlorbenzanthrone are from about 25 to 75 per cent. greater that when prepared by formerly known methods as based upon the yields of isoviolanthrone made therefrom.

Instead of dissolving the benzanthrone in a 70 per cent. sulfuric acid it may be dissolved in a stronger sulfuric acid, e. g. a 70 to a 100 per cent. sulfuric acid or stronger, and then diluted with the ice or water until the formation of two liquid phases occurs. Further, the reaction can be carried out at any temperature from 0° to 100° C. but temperatures not above 35° C. are preferred. Liquid chlorine or any suitable chlorinating agent introduced from without or generated in situ may be used in place of a current of gaseous chlorine, and the invention may be carried out at diminished, ordinary or superatmospheric pressure. Higher chlorinated derivatives may be obtained in a similar manner by using two or more moles of chlorine instead of one mole. Instead of chlorine or a chlorinating agent, bromine or a brominating agent may be employed.

I claim:

1. In the production of a halogen derivative of benzanthrone, a process which comprises subjecting benzanthrone to the action of a halogenating agent in the presence of sulfuric acid of about 60 to 70 per cent. strength.

2. In the production of a halogen derivative of benzanthrone, a process which comprises subjecting benzanthrone to the action of a halogenating agent in the presence of sulfuric acid, the amount and strength of sulfuric acid being such that a substantial amount of benzanthrone but not a halogenated benzanthrone will dissolve therein.

3. In the halogenation of benzanthrone, a process which comprises treating benzanthrone with a halogenating agent in the presence of sulfuric acid of a concentration providing two liquid phases with benzanthrone.

4. In the production of a chlorbenzanthrone, a process which comprises subjecting benzanthrone to the action of chlorine in the presence of sulfuric acid of a concentration providing two liquid phases with benzanthrone.

5. In the halogenation of benzanthrone, a process which comprises subjecting a mixture containing two liquid phases comprised of benzanthrone in sulfuric acid solution to the action of a halogenating agent.

6. In the production of a chlorbenzanthrone, a process which comprises dissolving benzanthrone in sulfuric acid, adding water to the solution until two liquid phases are formed, and subjecting the mixture thus produced to the action of chlorine.

7. In the production of a chlorine derivative of benzanthrone containing about 12 to 14 per cent. chlorine, a process which comprises subjecting a mixture of two liquid phases comprised of benzanthrone in sulfuric acid solution to the action of chlorine.

8. In the chlorination of benzanthrone, a process which comprises dissolving benzanthrone in 4 to 10 times its weight of 70 per cent. sulfuric acid, diluting the solution with water until two phases are formed but no benzanthrone is precipitated as a solid phase, and subjecting the mixture to the action of chlorine.

9. In a process of chlorinating benzanthrone, the improvement which comprises subjecting benzanthrone to the action of chlorine in the presence of 66 to 67 per cent. sulfuric acid, there being present two liquid phases.

10. In the production of a halogen derivative of benzanthrone, a process which comprises dissolving benzanthrone in sulfuric acid, adding water to the solution until two liquid phases are formed, and subjecting the mixture thus produced to the action of a halogenating agent.

11. In the production of a halogen derivative of benzanthrone, a process which comprises admixing benzanthrone with sulfuric acid, making up the concentration of the sulfuric acid in the admixture to about 60 to 70 per cent. with cooling, to form two liquid phases, and subjecting the mixture thus produced to the action of a halogenating agent.

12. In the production of a halogen derivative of benzanthrone, a process which comprises admixing benzanthrone with sulfuric acid, making up the concentration of the sulfuric acid in the admixture to about 60 to 70 per cent. strength with cooling to form two liquid phases, and subjecting the mixture thus produced to the action of chlorine at a temperature of about 20° to 30° C.

13. In the production of monochlorbenzanthrone, a process which comprises admixing benzanthrone with sulfuric acid, making up the concentration of the sulfuric acid in the admixture to about 61 to 67 per cent. strength with cooling, to form two liquid phases, and subjecting the mixture thus produced to the action of chlorine, at a temperature of about 20° to 30° C.

14. The process for producing a halogen derivative of benzanthrone which comprises halogenating a solution of benzanthrone in sulfuric acid, the sulfuric acid being of such a strength that the benzanthrone is comparatively soluble therein and the halogen derivative of benzanthrone produced is relatively insoluble therein.

15. The process for producing a halogen derivative of benzanthrone which comprises halogenating benzanthrone in 4 to 10 times its weight of dilute sulfuric acid of such strength that the benzanthrone is comparatively soluble therein, but the halogen derivative of benzanthrone produced is relatively insoluble therein.

16. In the production of a halogen derivative of benzanthrone, the process which comprises subjecting benzanthrone in 4 to 10 times its weight of dilute sulfuric acid of about 60 to 70 per cent. strength to the action of a halogenating agent.

In testimony whereof I affix my signature.

WILFRED M. MURCH.